Nov. 7, 1933.   E. O. COREY   1,934,407
FLANGE WHEEL LUBRICATOR
Filed May 20, 1932

INVENTOR
Elmer O. Corey
BY
Wood & Wood,
ATTORNEYS

Patented Nov. 7, 1933

1,934,407

UNITED STATES PATENT OFFICE 1,934,407

FLANGE WHEEL LUBRICATOR

Elmer O. Corey, Norwood, Ohio, assignor to The Edna Brass Manufacturing Company, Cincinnati, Ohio, a corporation of Ohio Application May 20, 1932. Serial No. 612,553

3 Claims. (Cl. 184—3)

This invention relates to improvements in oilers or lubricators having definite utility for oiling flanges of railway wheels and particularly to an oil distributing nozzle and means for suspendingly supporting the same for yieldingly sustaining the nozzle in contact with the wheel flange. The oil distributing nozzle is preferably in conduit connection with the distributing line of a force feed lubricator supplying the lubricant to the nozzle under pressure, and in which grades of heavy lubricant can be used.

An object of the invention is to provide an oiler or lubricator for distributing a lubricant to the flange of a railway wheel from a centralized lubrication distributing or supply source, from which the lubricant is transmitted under pressure.

Another object of the invention is to provide a wheel flange oil lubricator having a nozzle flexibly suspended for yieldingly constantly contacting against the flange of the wheel moving therewith in the lateral or side-wise sway of the wheel during its traveling motion and to accommodate for any wear of the tip of the nozzle which contacts with the wheel flange.

Another object of the invention is to provide a wheel flange oiler or lubricator nozzle of simple and durable construction and which can be readily mounted upon the truck or framing of the vehicle and appropriately position the nozzle with its tip end in constant contact with the wheel flange.

Other features and advantages of the invention will be more fully set forth in the description of the accompanying drawing in which.

Figure 1:
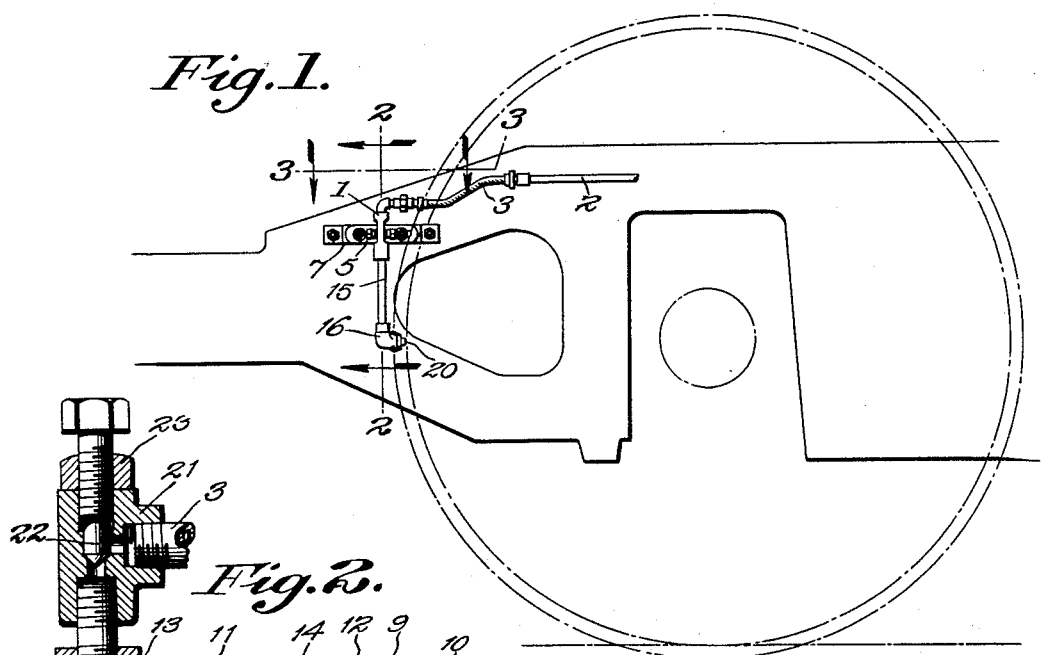
Figure 1 is a side elevation of the flange oiler as applied to the locomotive framing for oiling the flange of a drive wheel, the flange of the wheel being shown in dot and dash lines.

In the present embodiment, the oiler is shown as applied to the framing of a locomotive for lubricating the flange of one of the drive wheels. The upper end of the oiler is connected with a pipe or tube which leads to a feed outlet of a multi-outlet force feed lubricator of commercial type not shown. The force feed lubricator provides for a centralized distribution of the lubricant under pressure to various parts to be lubricated and each outlet of the lubricator has its own forcer pump capable of delivering a heavy lubricant. The forcer or pumping unit may provide for the necessary regulation or the lubricant feed may be regulated or controlled at the nozzle. The pumping unit is operated by suitable mechanism connecting with an operating part of the locomotive so as to be in operation only when the locomotive is in motion.

Referring to the drawing, 1 indicates a pipe coupling body constituting a pipe coupling fitting and hanger hingedly or pivotally mounted upon a bracket for swingingly supporting the nozzle, connected to the lower end of the body. The body has the opposite ends of its bore threaded for making pipe tubing connections therewith, one end connecting with the supply line and the other end with the nozzle.

The body 1 normally and as shown in the drawing is positioned vertically with the upper end connecting with a pipe 2 as a supply or distributing conduit leading from a force feed lubricator. A length of flexible tubing 3 is removably interposed between the body 1 and the supply pipe or tube 2 to accommodate for the swing of the body for maintaining the nozzle, connecting with the opposite or lower end of the body, in constant contact with the flange of the wheel.

The body is provided with a pair of ears 4—4, extending laterally, centrally thereof, pivotally connected to a yoke arm of a bracket 5. The base 6 of the bracket is bolted to a bracket support 7 rigidly fixed to the framing of the locomotive, or the like, as a stationary support or mounting for the oiler, adapting the nozzle to be appropriately hung relative to the part to be lubricated.

The base of the bracket longitudinally is provided with a pair of elongated slots respectively at opposite sides of the bracket arm through each of which a bolt 8 is engaged for adustably securing the bracket to the bracket support 7. The base of the bracket centrally and at opposite sides thereof has laterally extended ears 9—9, each carrying a screw stud 10 providing an adjustable support for one end of a spring 11 interposed between the bracket base and body 1. The one end of the spring bears against an annular flange 12 and at the opposite end the spring is seated within a recess formed in a boss 13 extending from the side of the body. The stud 10 is also provided with an axially extending stem 14 engaged into the spring serving as a guide to hold the spring against displacement.

A pair of springs are employed one at each side of the pivotal connection of the body to the bracket. This arrangement of springs at relative opposite sides of the pivot stabilizes the position of the body and yieldingly sustains the nozzle in contact with the wheel flange, accommodating for any sidewise sway of the wheel while in motion. The tension of the springs can be relatively varied by the adjusting screw to take up for wear of the nozzle tip and to maintain the nozzle in an appropriate position necessary to keep its tip in contact with the wheel flange. The tension of the springs should only be sufficient to insure that the nozzle will follow the wheel to the limit of its lateral sway. Any undue tensional pressure will cause excessive wear of the nozzle tip.

The nozzle comprises an extension or connecting tube 15, one end screw-threaded into the lower end of the body and its opposite end carrying an elbow 16. The elbow is provided with a spring pressed ball check valve 17 housed within one end of the elbow, the elbow being counterbored to provide a seat for the ball valve. The valve is closed under the pressure of a spring 18 having one end engaged against the ball and its opposite end against a valve retainer sleeve screw 19 screw-threaded in the bore of the elbow in rear of a removable nozzle tip 20 likewise screw-threaded into the end of the elbow having an annular flange abutting the end of the elbow.

The valve is opened under the discharging pressure of the lubricant and automatically closes as the supply pressure is reduced or when the supply is discontinued as when the pump or locomotive is not in motion. The check valve serves to constantly keep a supply head of lubricant in the feed line to the nozzle tip and prevents leakage when idle. The check valve being in advance of the tip permits the tip to be renewed without disturbing the valve. The conduit parts of the lubricator are all rigidly connected together capable of withstanding severe jar without loosening, and secure against leakage. The nozzle joining with the hanger body by a connection length of commercial tubing permits convenient change in reach lengths to be made by merely substituting different lengths of the tubing.

Figure 2:
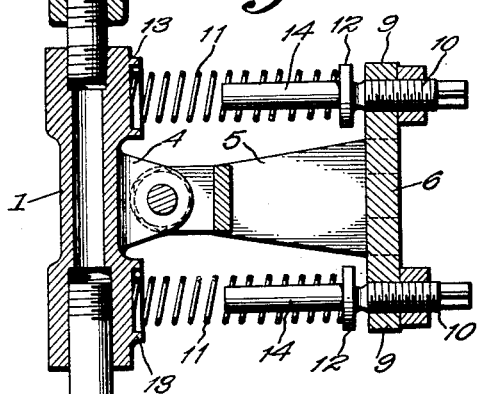
Figure 2 is an enlarged section on line 2—2, Figure 1, with the nozzle shown in elevation.
Figure 3:
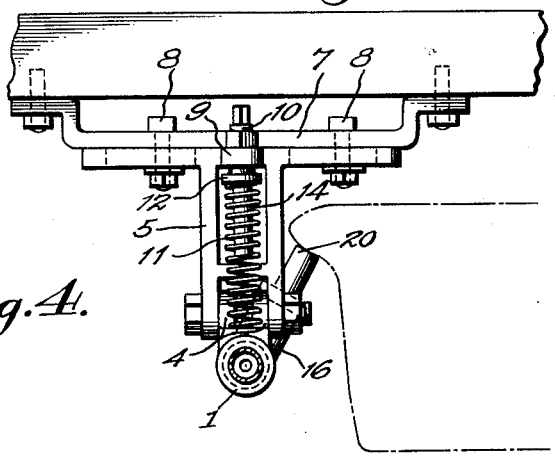
Figure 3 is a top plan view taken from line 3—3, Figure 1, with the distributing or supply tube connecting at the upper end of the oiler in section and a portion of the wheel in dot and dash lines.
Figure 4:
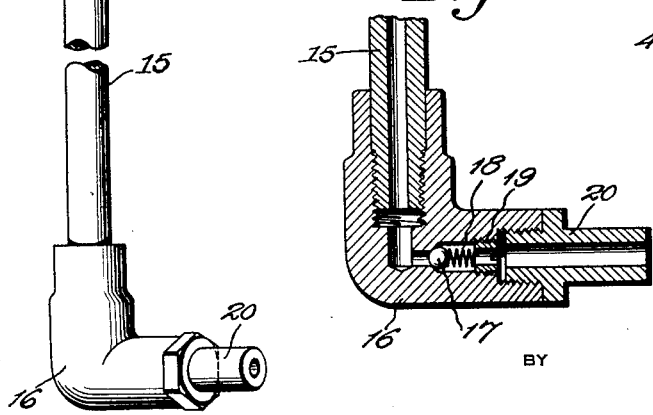
Figure 4 is a vertical section through the nozzle.

When several wheel flange lubricators or lubricant distributors are connected in branch with a single distributing line from the delivery apparatus provision is made for regulating the supply for each nozzle. As shown in Figure 2, a valve is interposed in the lubricant supply or feed line at the upper end of the coupling body 1. The valve has a T-body 21 for making an angle connection with the feed supply line 3 with the valve 22 extending vertically and axially with the coupling body 1, screw-threaded into the T-body, controlling the passage connecting the inlet with the feed line 3 of the outlet with the coupling body 1. The valve is locked to a setting by a lock nut 23 screw-threaded upon the stem of the valve and abuttingly engaging with an end face of the valve body 21.

Having described my invention, I claim:

1. In a flange lubricator, a conduit for conducting the lubricant from a supply source, a check valve and nozzle as a terminal of said conduit, the nozzle adapted to contact with a flange or wheel, a pipe coupling body interposed in said conduit hingedly supported, and a pair of springs cooperating with said coupling body at relative opposite sides of its fulcrum to resiliently press said nozzle in contact with the flange or wheel.

2. In a flange lubricator, a bracket support, a body providing a pipe coupling pivotally mounted upon said bracket support, springs interposed between the bracket support and body at opposite sides of the fulcrum connecting said parts for stabilizing the body or nozzle in conduit connection with one end of said body having a removable nozzle tip, and a check valve in said nozzle located in advance of the nozzle tip.

3. In a device for lubricating the flange of a vehicle wheel, a bracket secured to the frame of the wheel, a conduit coupling hingedly mounted upon said bracket, springs at opposite sides of the fulcrum of the hinge connecting said coupling and bracket, a lubricant distributing nozzle connecting with and extending from said coupling having a renewable tip for contacting with the flange of the wheel, and a check valve in the nozzle between the coupling and the tip open under a conveying pressure of lubricant.

ELMER O. COREY.